United States Patent
Mathewson, II et al.

(10) Patent No.: US 6,327,624 B1
(45) Date of Patent: Dec. 4, 2001

(54) COMMUNICATION OF OBJECTS INCLUDING JAVA BYTECODES BETWEEN 3270 LOGICAL UNITS INCLUDING JAVA VIRTUAL MACHINES

(75) Inventors: James Merwin Mathewson, II, Chapel Hill; Marcia Lambert Peters, Raleigh, both of NC (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/073,424

(22) Filed: May 6, 1998

(51) Int. Cl.[7] .................................................. G06F 13/00
(52) U.S. Cl. .................... 709/231; 709/219; 709/227; 709/311
(58) Field of Search ..................................... 709/231, 227, 709/236, 237, 305, 221, 224, 213, 226, 311, 219

(56) References Cited

U.S. PATENT DOCUMENTS

| 5,021,949 | * | 6/1991 | Morten et al. | 709/231 |
| 5,063,500 | * | 11/1991 | Shorter | 709/226 |
| 5,649,101 | | 7/1997 | Mathewson, II | 395/200.02 |
| 5,754,830 | * | 5/1998 | Butts et al. | 709/311 |
| 5,907,678 | * | 5/1999 | Housel, III et al. | 709/213 |
| 5,931,913 | * | 8/1999 | Meriwether et al. | 709/227 |
| 5,954,798 | * | 9/1999 | Shelton et al. | 709/224 |
| 5,958,013 | * | 9/1999 | King et al. | 709/227 |
| 5,964,836 | * | 10/1999 | Rowe et al. | 709/221 |

OTHER PUBLICATIONS

IBM, "*3270 Information Display System Data Stream Programmer's Reference*", GA23–0059–07, 1992.
*3174 Establishment Controller: Functional Description*, International Business Machines Corporation, 1994.

* cited by examiner

Primary Examiner—Robert B. Harrell
Assistant Examiner—Almari Romero
(74) Attorney, Agent, or Firm—Myers Bigel Sibley & Sajovec; Jeanine S. Ray-Yarletts

(57) ABSTRACT

Java and other objects are integrated with legacy 3270 applications by sending 3270 datastream communications between a primary logical unit (LU) and a secondary LU over a network using 3270 datastream architecture and sending 3270 datastream structured fields including embedded objects such as Java bytecodes between the primary LU and the secondary LU over the network using 3270 datastream architecture. The sending of 3270 datastream communications and the sending of 3270 datastream structured fields are repeated in an arbitrary sequence, to thereby asynchronously send 3270 datastreams and objects such as Java bytecodes between the primary LU and the secondary LU over the network using 3270 datastream architecture. Thus, objects such as Java bytecodes are sent using the LU2 protocol in a manner that need not interfere with legacy communications between a 3270 application and an end user.

56 Claims, 13 Drawing Sheets

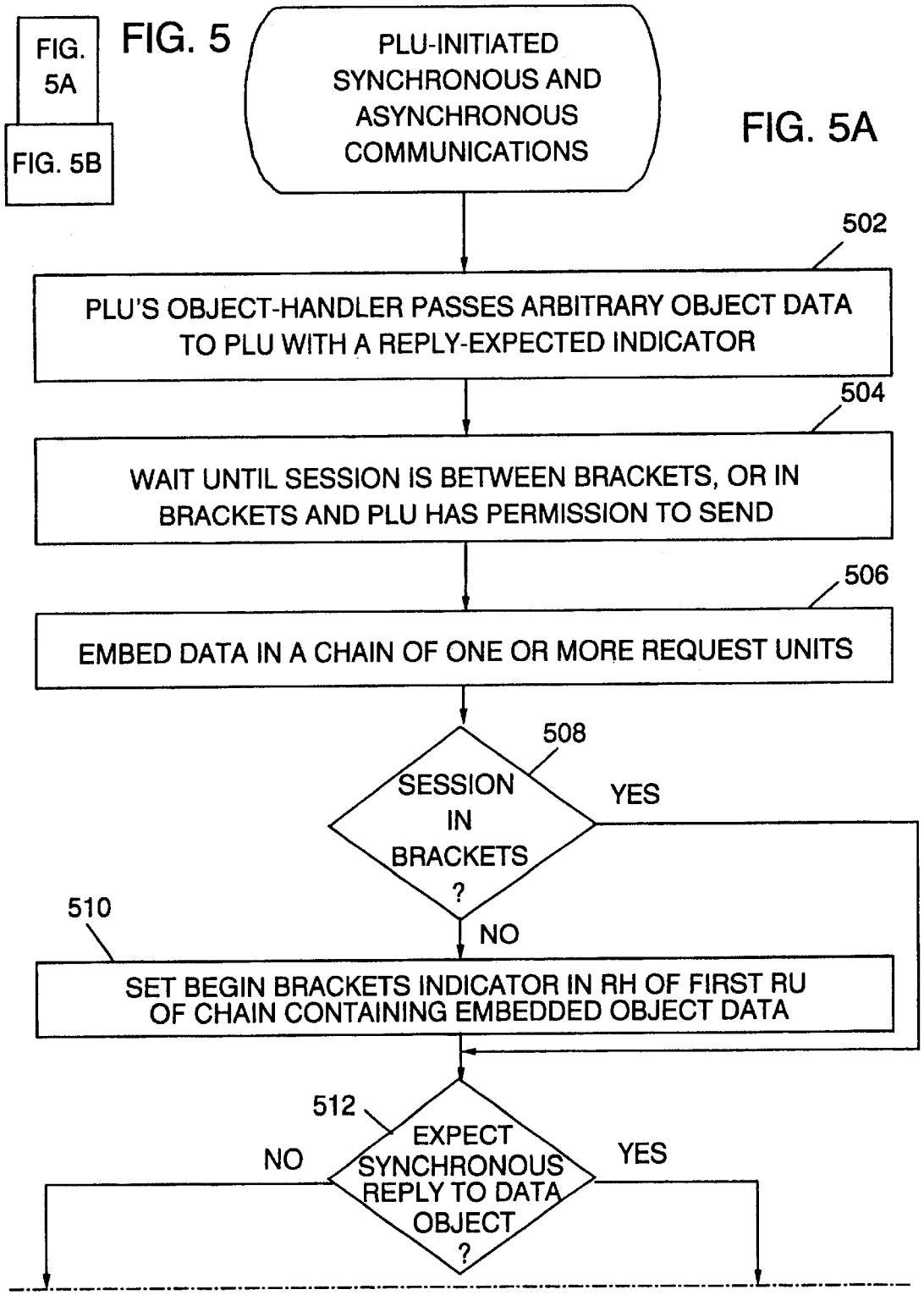

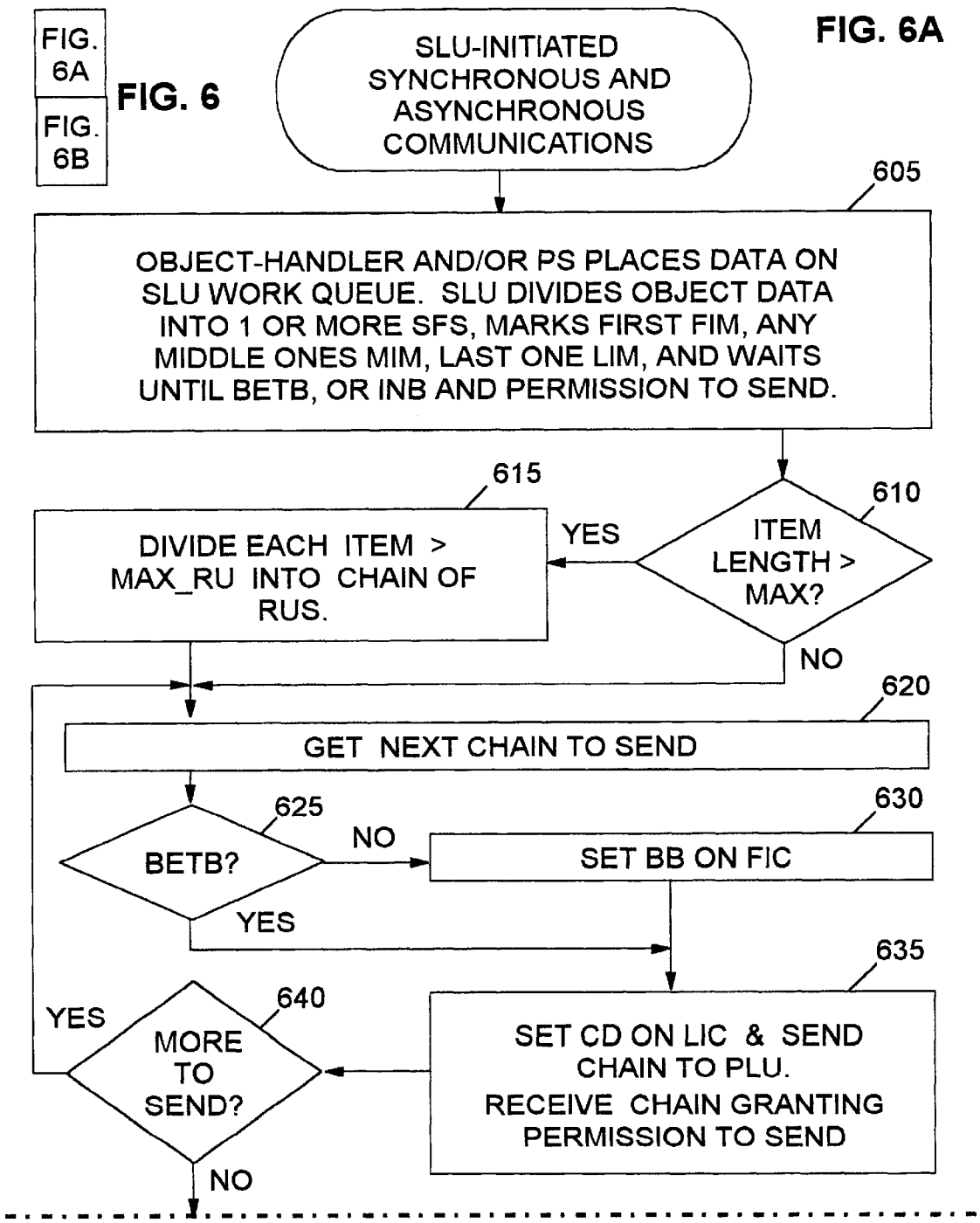

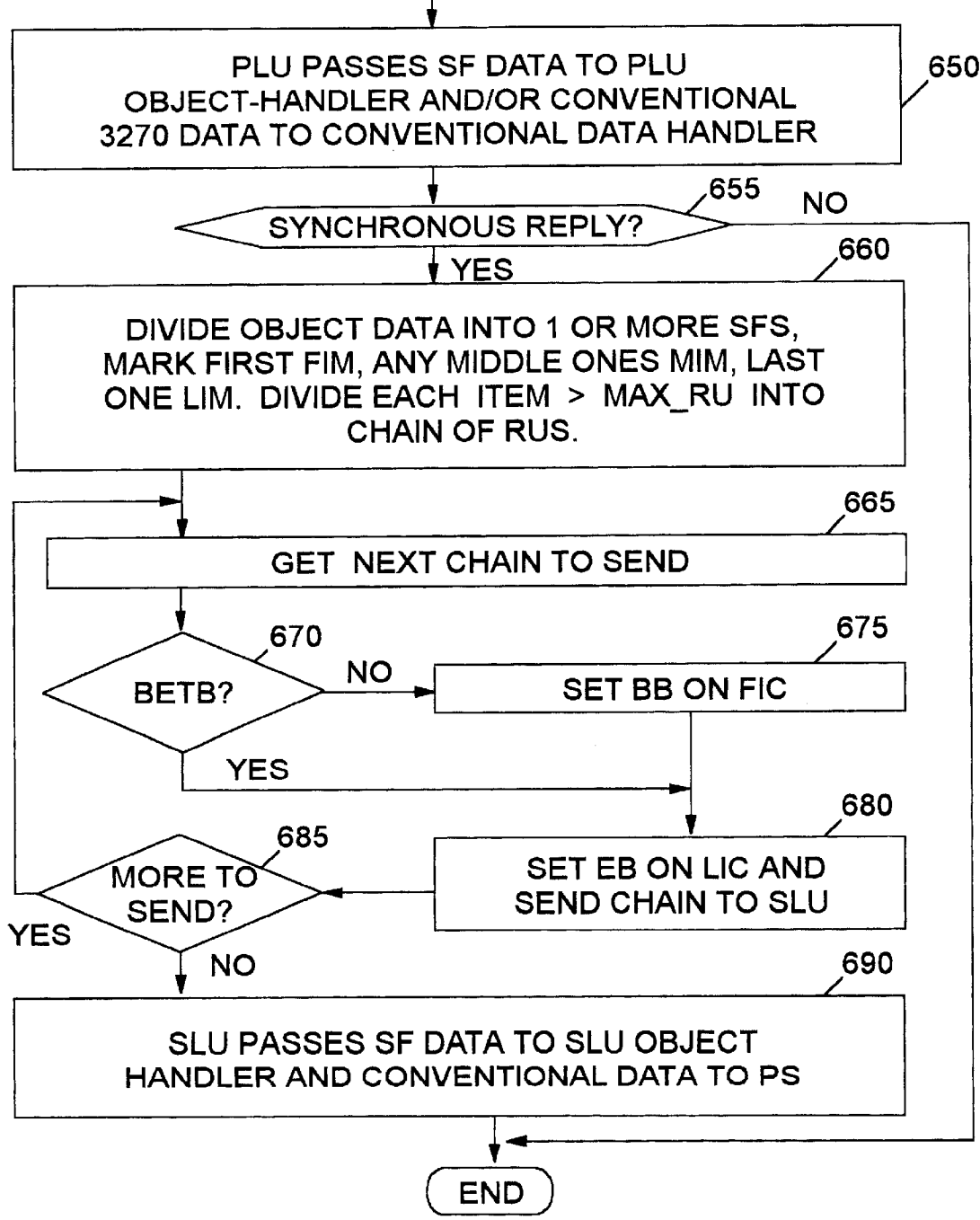

```
         3270    JVM    PLU                                      SLU          JVM    3270
         Appl.   .      .                                        .            .      Presentation
                 .      .                                        .            .      Space
         .       .      .                                        RMI (data)   .      .
  1.     .       .      .                                       <------------ .      .
         .       .      [BB], CD, AID X'88', Java SF, FIM (data) .            .      .
  2.     .       .     <-----------------------------------+     .            .      .
         .       .      [EB], CD                                 .            .      .
  3.     .       .     ----------------------------------->      .            .      .
         .       .      [BB], CD, AID X'88', Java SF, MIM (data) .            .      .
  4.     .       .     <-----------------------------------      .            .      .
         .       .      [EB], CD                                 .            .      .
  5.     .       .     ----------------------------------->      .            .      .
         .       .      .                       :                .            .      .
         .       .      .                       :                User modified presentation
         .       .      .                                        space and pressed ENTER
  6.     .       .      .                                       <------------------
         .       .      [BB], CD, AID X'7D',                     .            .      .
         .       .      conventional 3270 screen data            .            .      .
  7.    <------------<-----------------------------------+       .            .      .
         update 3270 screen                                      .            .      .
  8.    +------------>  .                                        .            .      .
         .       .      | [EB], CD, Erase/Write conventional 3270 screen data .      .
  9.     .       .     +-------------------------------------->---------------------->
         .       .      [BB], CD, AID X'88', Java SF, LIM (data) .            .      .
 10.     .       .     <-----------------------------------      .            .      .
         RMI (data) |                                             .            .      .
 11.    <-----------+                                             .            .      .
         .       .                                                .            .      .
         .       .      :                                         .            .      .
         RMI (reply) .                                             .            .      .
 12.    ------------>   .                                         .            .      .
         .       .      EB, WSF, Java SF, FIM (reply data)         .            .      .
 13.     .       .     ---------------------------------->         .            .      .
         .       .      BB/EB, WSF, Java SF, MIM (reply data)      .            .      .
 14.     .       .     ---------------------------------->         .            .      .
         .       .      .                       :                  .            .      .
         .       .      .                                          .            .      .
         .       .      BB/EB, WSF, Java SF, LIM (reply data)      .            .      .
 15.     .       .     ---------------------------------->         .            .      .
         .       .      .                                        | RMI (reply data).
 16.     .       .      .                                       +----------->   .
```

FIG. 8

```
         JVM         PLU                       SLU           JVM
                      .                         .             .
                      .                         .             .
                      .                         .             .
                      .                         .       send (socket, data)
  1.    .             .                         .       <------------
                      .     [BB], CD, AID X'88', Java SF, FIM (data)  .
  2.    .             <----------------------------+                  .
                      .     [EB], CD                  .               .
  3.    .             ---------------------------->                   .
                      .     [BB], CD, AID X'88', Java SF, MIM (data)  .
  4.    .             <----------------------------                   .
                      .     [EB], CD                  .               .
  5.    .             ---------------------------->                   .
                      .     [BB], CD, AID X'88', Java SF, LIM (data)  .
  6.    .             <----------------------------                   .
                      .     EB, CD                    .               .
  7.    .             ---------------------------->                   .
        post (socket, data)                           .               .
  8.    <----------+                                  .               .
```

FIG. 12

```
JVM         Host                              Emulator    Audio
                                                          Player 1.                                            listen (socket)
   send streaming                             <------------------
   audio(socket, data)
2. --------->
            | RH: Req, OIC, BB/EB
            | RU: WSF, Audio Data SF, flags=only, (data)
            |     audio present = 1, play immediately = 1
3.          ------------------------------------------>
                                              | post (socket, data)
4. send streaming                             -------------------->
   audio (socket, data)
5. --------->
            | RH: Req, OIC, BB/EB
            | RU: WSF, Audio Data SF, flags=only, (data)
            |     audio present = 1, play immediately = 1
6.          ------------------------------------------>
                           :                  | post (socket, data)
7.                         :                  -------------------->
   send streaming          :
   (socket, data)
14. ----
      |     RH: Req, OIC, BB                  User presses Enter
      |     RU: AID="Enter", 3270 screen data |
15.   |   <---------------------------------------
      | |
16.   ----|----> dropped
          |
17. <-----|
          | RH: +Rsp, OIC, EB, CD
18.       ------------------------------------>
```

FIG. 13

COMMUNICATION OF OBJECTS INCLUDING JAVA BYTECODES BETWEEN 3270 LOGICAL UNITS INCLUDING JAVA VIRTUAL MACHINES

CROSS-REFERENCE TO RELATED APPLICATION

This application is related to application Ser. No. 09/073,423, filed concurrently, entitled "Integration of Objects Including Java Bytecodes With Legacy 3270 Applications" assigned to the assignee of the present invention, the disclosure of which is hereby incorporated herein by reference.

FIELD OF THE INVENTION

This invention relates to data processing systems (apparatus), methods and computer program products, and more particularly to data processing systems, methods and computer program products that use the 3270 datastream architecture.

BACKGROUND OF THE INVENTION

Data processing systems, methods and computer program products that use the 3270 datastream architecture have been widely used for decades. The 3270 datastream architecture has been so widely used, that systems using the 3270 datastream architecture are often referred to as "legacy" systems.

The 3270 datastream architecture is used to communicate between a Primary Logical Unit (PLU) and a Secondary Logical Unit (SLU) using LU2 protocol. It will be understood that the primary and secondary logical units may be mainframe computers, midrange computers, personal computers, terminals, workstations or one or more computer programs that execute on one or more of the above. The 3270 datastream architecture is described in many publications, including but not limited to the "IBM 3270 Information Display System Datastream Programmer's Reference", published by International Business Machines Corporation (IBM), the assignee of the present application, IBM Publication Number GA23-0059-07, 1982, the disclosure of which is hereby incorporated herein by reference.

As shown in FIG. 1, a data processing system 100 includes a PLU 110 and an SLU 120 that communicate with each other over a network 130 using the 3270 datastream. The PLU 110 may also be referred to as a host or server, and the SLU 120 may be referred to as a terminal, workstation, emulator or client. It will be understood that, although FIG. 1 illustrates a simple data processing system 100 including one PLU 110, one SLU 120 and a simple network connection 130, the 3270 datastream architecture is generally used to communicate among many PLUs and SLUs using complex network environments. An example of a more typical data processing system using 3270 datastream architecture may be found in U.S. Pat. No. 5,649,101, entitled "System and Method for Improving 3270 Data Stream Performance by Reducing Transmission Traffic" to Mathewson II, assigned to the assignee of the present invention, the disclosure of which is hereby incorporated herein by reference.

The 3270 datastream architecture was designed before graphical user interfaces (GUI) became commonplace. Because of the ease of use that a graphical user interface may provide, it is desirable to provide graphical user interfaces for 3270 datastream architecture systems. However, due to the legacy nature of 3270 datastream architecture systems, it is generally desirable to provide graphical user interfaces without requiring rewriting of legacy code or rearchitecting of legacy systems.

One widely used programming language that can provide a rich graphical user interface is Java As is well known to those having skill in the art, Java programs, in compiled form, are generally portable and will generally run on a wide range of computers and operating systems. Stated differently, Java provides a machine-dependent desktop for executing machine independent applications and applets. Java programs support referencing Universal Resource Locator (URL) identifiers with content types of, for example, audio/basic, audio/x-WAV image/GIF and image/JPEG.

Accordingly, it would be desirable to integrate Java with legacy 3270 applications to obtain the advantages of Java as a portable programming language and the potential cost-savings of Java's centralized application distribution paradigm. However, it would be desirable to integrate Java with legacy 3270 applications without the need to write new legacy applications or to modify existing legacy applications.

Many techniques exist for integrating Java with legacy 3270 applications. These techniques include screen-scraping, an HTML gateway, an object request broker and loading Java classes over LU2 and LU6.2. However, each of these techniques may have shortcomings as described below.

Screen-scraping is a technique of interacting programmatically with the 3270 datastream at the client, in order to combine host data from one or more sources with new program logic and a graphical user interface. The client application gains access to the 3270 data through an application programming interface on a terminal emulator. This program can read the screen contents, issue keystrokes and perform all the other actions that a user could perform. Unfortunately, although it may offer a cosmetic improvement compared to a standard 3270 screen, the screen-scraping application may be vulnerable to a positional change in the host data, such as a date change that shifts data to a new screen offset. Moreover, screen-scraping may also require distributing the application, and subsequent updates to it, to all clients. This problem may be partly overcome by writing the screen-scraper application in Java, if a TCP/IP network is available over which the Java application could be distributed, but this may not automatically confer all of Java's benefits. The client application may still need to be distributed to all the client workstations, or may need to be stored on a separate web server, if having a parallel infrastructure is acceptable. In a large enterprise, however, it may take years to make such a sweeping network change, with all the accompanying administrative hardware and software changes.

A hypertext mark-up language (HTML) gateway is a more general extension of screen-scraping. An HTML gateway is a separate program between a host application and a 3270 emulator. The HTML gateway can convert the entire 3270 datastream to HTML. The client then becomes a browser. An HTML gateway may reproduce the visual appearance of a 3270 screen, or it may interpret the data and convert it into a new graphical user interface representation. It is even possible to read-in the 3270 screen maps residing on the host that are used to format data extracted from a database for 3270 presentation, interpret them and use this augmented information to generate a more tailored HTML screen. Existing products, such as VisualAge for Small Talk Version 3.0 interact with these Basic Mapping Support (BMS) or Message Format Service (MFS) maps.

Unfortunately, HTML gateways may have drawbacks because host applications generally cannot handle unexpected navigational sequences. Thus, if a user presses the browser's Back button to display a previous screen, and then presses a key, causing input to the host application, the application state may not match the data. This could cause a program crash or an undetected logic error that puts incorrect data into a database. Moreover, if the secondary logical unit is at an intermediate gateway rather than at the client, it may be difficult to diagnose faults that occur between-the gateway and the client, or to correlate faults at the gateway with the session between the host and the gateway.

Object Request Brokers may be used to replace 3270 datastream communications with object-oriented remote procedure calls. Thus, access to legacy data and legacy applications may be provided by wrapping them in an object wrapper. An Object Request Broker is an example of an object wrapper. Unfortunately, this approach may require monolithic new software development. It may not lend itself to incremental replacement of legacy applications. However, with the large amount of legacy application code that is present, it may not be feasible to replace these applications monolithically. Moreover, remote method invocations and remote procedure calls may not be optimized for the delays and limited bandwidth that are typical of a wide area network, so that performance may be unsatisfactory or degraded.

Finally, Java classes may be loaded by a modified Java class loader that uses LU2 and LU6.2 sessions as its transport. By typing a command on a host command line, a user can invoke the Systems Network Architecture (SNA) for Java class loader. However, this may not integrate Java with the 3270 datastream.

The above survey indicates that although it is generally desirable to integrate Java with legacy 3270 applications, there may be shortcomings with conventional techniques for doing so. Accordingly, there continues to be a need for systems, methods and computer program products for passing Java bytecodes between a primary logical unit and a secondary logical unit that communicate with each other over a network using 3270 datastream architecture.

The 3270 datastream architecture communications between a PLU and a SLU generally take place in a manner that is quite different from communications using Java. More specifically, communications between a primary logical unit and a secondary logical take place using LU2 protocol.

As is well known to those having skill in the art, the LU2 protocol is half-duplex flip-flop (two-way alternating) protocol. A sender sets a Change Direction indicator when it has finished a transmission, and expects the next transmission to be from the receiver. Brackets delineate a series of Request/Response Units (RUs) that together provide a single transaction. Between brackets, either the PLU or the SLU may begin a new bracket. In the case of bracket contention, the SLU has priority. Only the PLU can end a bracket. Chaining allows multiple RUs to be sent in a group to the same LU. When a definite response or exception response is requested, a chain is the unit that the LU acknowledges or rejects. LU2 protocol is described in many publications, including but not limited to the "*IBM 3174 Establishment Controller Functional Description*", published by International Business Machines Corporation (IBM), the assignee of the present application, IBM Publication No. GA23-0218-11, 1994, the disclosure of which is hereby incorporated herein by reference.

In contrast, Java programs (applets) generally are dynamically downloaded from a web server. Java applets are generally invoked from a web browser by an "applet" tag embedded in HyperText Mark-up Language (HTML). Java generally operates on an Internet Protocol (IP) network.

Notwithstanding these differences, it would be desirable to pass Java bytecodes between a first Java Virtual Machine (JVM) in a PLU and second JVM in an SLU that communicate with each other over a network using 3270 datastream architecture. Such communications should preferably take place asynchronously, and the Java bytecode communications should not significantly impact conventional 3270 datastream communications.

SUMMARY OF THE INVENTION

It is therefore an object of the present invention to provide improved systems, methods and computer program products for communicating Java bytecodes and other arbitrary data objects between 3270 logical units.

It is another object of the present invention to allow asynchronous communication of Java bytecodes and other objects between 3270 logical units.

It is still another object of the present invention to allow communication of Java bytecodes and other objects between 3270 logical units without significantly impairing the ability of a legacy application and an end user to interact in a conventional manner.

These and other objects are provided, according to the present invention, by communicating between a primary LU and a secondary LU that communicate with each other over a network using 3270 datastream architecture, by sending 3270 datastream communications between the primary LU and the secondary LU over the network using 3270 datastream architecture and sending 3270 datastream structured fields including embedded Java bytecodes between the primary LU and the secondary LU over the network using 3270 datastream architecture. The sending of 3270 datastream communications and the sending of 3270 datastream structured fields are repeated in an arbitrary sequence, to thereby asynchronously send 3270 datastreams and Java bytecodes between the primary LU and the secondary LU over the network using 3270 datastream architecture. Structured fields are well known elements of the 3270 datastream architecture that are used to send and receive additional control functions and data. The use of 3270 datastream structured fields to embed Java bytecodes is described in the above cross-referenced related application.

According to the invention, the PLU includes a first Java Virtual Machine (JVM) and the SLU includes a second JVM. The Java bytecodes are passed from the first JVM to the second JVM over a network using 3270 datastream architecture by sending Java bytecodes from the first JVM to the corresponding PLU, and waiting until a 3270 communication session between the PLU and the SLU is between brackets, or is in brackets, and the PLU has permission to send. If the session is between brackets, a Begin Brackets request header is sent from the PLU to the SLU. At least one request unit is sent from the PLU to the SLU, the at least one request unit containing a 3270 datastream structured field with the Java bytecodes embedded therein. The embedded Java bytecodes are then sent from the SLU to the second JVM.

If a synchronous reply to the Java bytecodes is expected, then an In Brackets indicator is sent in a last of the at least one request unit containing a 3270 datastream structured field with the Java bytecodes embedded therein. Reply Java bytecodes are sent from the second JVM to the SLU. An In Brackets, Change Direction request header is sent from the SLU to the PLU. At least one request unit is sent from the SLU to the PLU, the at least one request unit containing a 3270 datastream structured field with the reply Java bytecodes embedded therein. The embedded reply Java bytecodes are sent from the PLU to the corresponding first JVM. Thus, Java bytecodes may be passed synchronously or asynchronously along with reply Java bytecodes.

Moreover, if a synchronous reply to the Java bytecodes is not expected, an End Brackets indicator is set in a last of the at least one request unit containing a 3270 datastream structured field with the Java bytecodes embedded therein. The at least one request unit preferably includes a plurality of chained request units, with the Java bytecodes embedded therein. Thus, asynchronous communications may be provided.

Java bytecodes are also passed from the second JVM in an SLU to a first JVM in a PLU by sending Java bytecodes from the second JVM to the corresponding SLU and waiting until a 3270 communication session between the PLU and the SLU is Between Brackets, or is In Brackets and the SLU has permission to send. A chain indicating Change Direction in its Request Header is sent from the SLU to the PLU, said chain containing a 3270 datastream structured field with at least some of the Java bytecodes embedded therein. If the chain does not contain all of the Java bytecodes embedded therein, a Change Direction request header is sent from the PLU to the SLU and a chain from the SLU to the PLU indicating Change Direction in its Request Header followed by a chain from the PLU granting permission to send are repeatedly sent until all the embedded Java bytecodes have been sent from the SLU to the PLU. The embedded Java bytecodes are sent from the PLU to the first JVM after all the embedded Java bytecodes have been sent from the SLU to the PLU.

If a synchronous reply to the embedded Java bytecodes is expected, then reply Java bytecodes are sent from the first JVM to the PLU. An End Brackets chain is sent from the PLU to the SLU. At least one request unit is sent from the PLU to the SLU, the at least one request unit containing a 3270 datastream structured field with the reply Java bytecodes embedded therein. The embedded reply Java bytecodes are sent from the SLU to the corresponding second JVM. Accordingly, Java bytecodes may be passed from the second JVM to the first JVM with reply bytecodes being synchronously or asynchronously returned.

Streaming audio may be sent from a first JVM in a PLU to a second JVM in an SLU by sending from the first JVM to the PLU streaming audio and by sending a Begin Brackets/End Brackets request header from the PLU to the SLU. A single request unit is sent from the PLU to the SLU. The single request unit contains a 3270 datastream structured field with the streaming audio embedded therein. The embedded streaming audio is then sent from the SLU to the second JVM. The streaming audio is then played in the second JVM.

The 3270 datastream structured field may contain a "Play Immediately" flag. Alternatively, the streaming audio may be buffered in the second JVM. The streaming audio data may be stopped in response to a request header that is sent from the secondary LU to the primary LU. A request unit is then sent from the secondary LU to the primary LU, the request unit containing a 3270 datastream therein.

The present invention can also be used with objects other than Java bytecodes. Thus, for example, image, audio and other objects may be integrated with legacy 3270 applications by embedding the object in a 3270 datastream structured field, and passing the 3270 datastream structured field, including the object so embedded, between a primary logical unit and a secondary logical unit that communicates with each other over a network using 3270 datastream architecture, as described above for Java bytecodes and reply bytecodes.

Accordingly, an LU2 session that uses half-duplex flip-flop protocols may be used to implement a generalized asynchronous socket service that allows two JVMs to send Java bytecodes or other objects to one another. This capability can be implemented without significantly impairing the ability of the legacy application and the end user to interact in a conventional manner. Java programs may be written to invoke any socket function, such as by making remote procedure calls or remote method invocations. Thus, an applet may be asynchronous and multi-threaded. Asynchronous and multi-threaded operations may be transmitted quasi-concurrently with legacy 3270 data using 3270 datastream communications on a session. Either JVM can send to the other at will without requiring polling. Improved communication of Java bytecodes between 3270 logical units may thereby be obtained. It will be understood by those having skill in the art that the present invention may be embodied as methods, apparatus (systems) and/or computer program products.

BRIEF DESCRIPTION OF THE DRAWINGS

FIG. 6 is a flowchart illustrating SLU-initiated synchronous and asynchronous communications wherein an object-handler, including but not limited to a Java Virtual Machine (JVM), co-located with the SLU, passes arbitrary object data, including but not limited to Java bytecodes and Java Remote Method Protocol, over a 3270 session that is being used quasi-concurrently for legacy 3270 communications, to a peer object-handler co-located with the PLU, and optionally for the PLU's object-handler to send a synchronous reply.

FIGS. 8–13 illustrate specific examples of communication flows that integrate Java with legacy 3270 applications according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
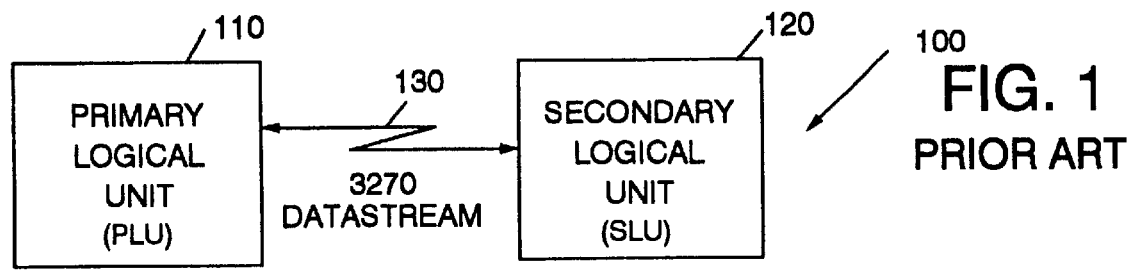
FIG. 1 is a simplified block diagram of a conventional data processing system using 3270 datastream communication.
Figure 2:
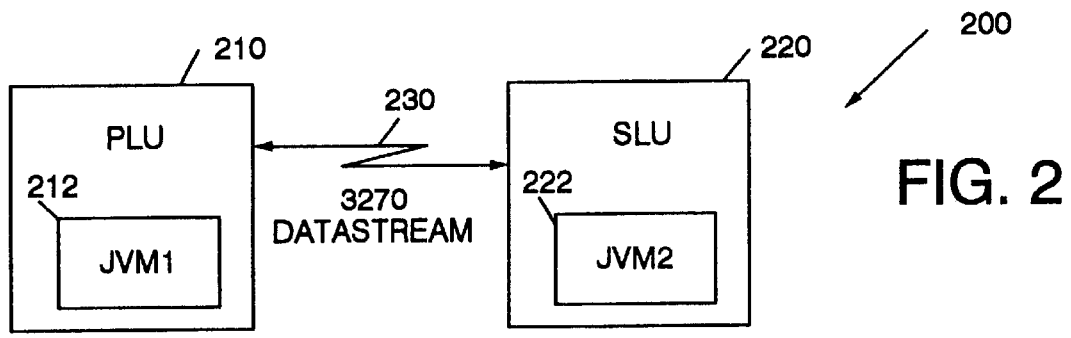
FIG. 2 is a simplified block diagram of a data processing system including Java Virtual Machines.

Referring now to FIG. 2, a data processing system 200 includes a Primary Logical Unit (PLU) 210 and a Secondary Logical Unit (SLU) 220 that communicate with each other over a network 230 using the 3270 datastream. The PLU also includes a first Java Virtual Machine (JVM) 212 and the SLU 220 includes a second JVM 222. The PLU 210 may also be referred to as a host or server, and the SLU 220 may be referred to as a terminal, workstation, emulator or client. It will be understood that, although FIG. 2 illustrates a simple data processing system 200 including one PLU, one SLU 220 and a simple network connection 230, the 3270 datastream architecture is generally used to communicate among many PLUs and SLUs using complex network environments. An example of a more typical data processing system using 3270 datastream architecture may be found in U.S. Pat. No. 5,649,101, entitled "*System and Method for Improving* 3270 *Data Stream Performance by Reducing Transmission Traffic*" to Mathewson II, assigned to the assignee of the present invention, the disclosure of which is hereby incorporated herein by reference.

As will also be appreciated by one of skill in the art, the present invention may be embodied as methods, systems (apparatus), or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Operations for various aspects of one embodiment of the present invention are illustrated in detail in FIGS. 4C–7 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as was described in FIGS. 4C–7, or by combinations of special purpose hardware and computer instructions.

Figure 3A:
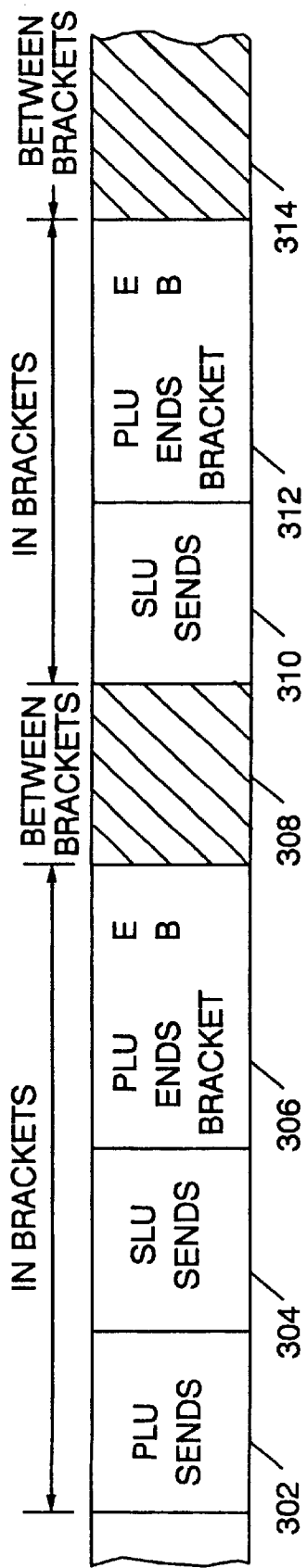
FIGS. 3A and 3B depict a sequence of conventional 3270 datastream communications between a PLU and an SLU.
Figure 3B:
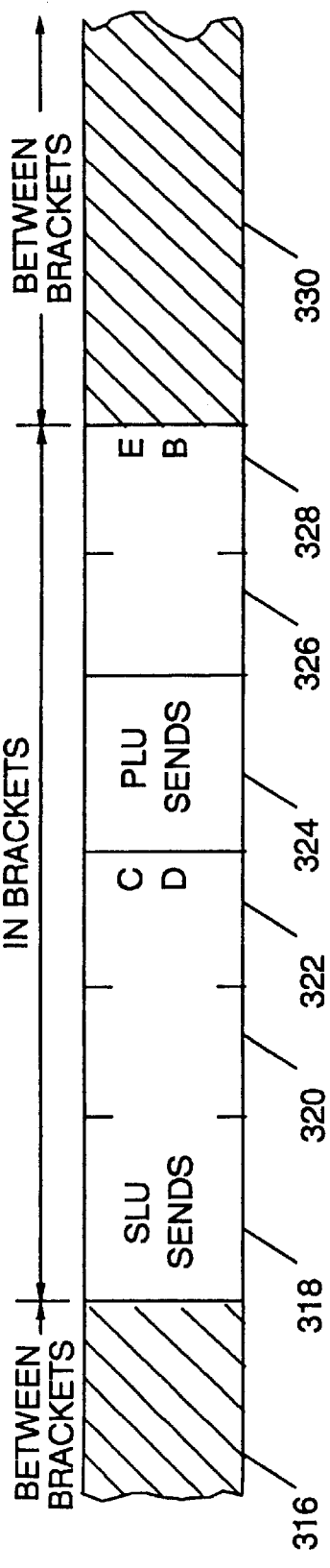

FIGS. 3A and 3B depict a sequence of conventional 3270 datastream interactions between a PLU and an SLU. It will be noted that the PLU and the SLU take turns sending, using a half-duplex flip-flop protocol in which permission to send is conferred by passing a token known as the "Change Direction" (CD) indicator. Either the PLU, shown at 302, or the SLU, shown at 310 and 318, can begin a sequence of communications known as a bracket. However, only the PLU can end a bracket, as shown in 306, 312, and 328. During time intervals 302–306, 310–312 and 318–328, the session is "in brackets". While in brackets, permission to send is governed by the Change Direction indicator. At other times when neither LU is sending (308, 314, 316 and 330), the session is "between brackets". An LU may send just a single RU, such as in 302, 304, 306, 310 and 312. Alternatively, an LU may send a chain of RUs, such as the SLU's chain 318–322, and the PLU's chain 324–328. These concepts are well known to one skilled in the art.

Figure 4C:
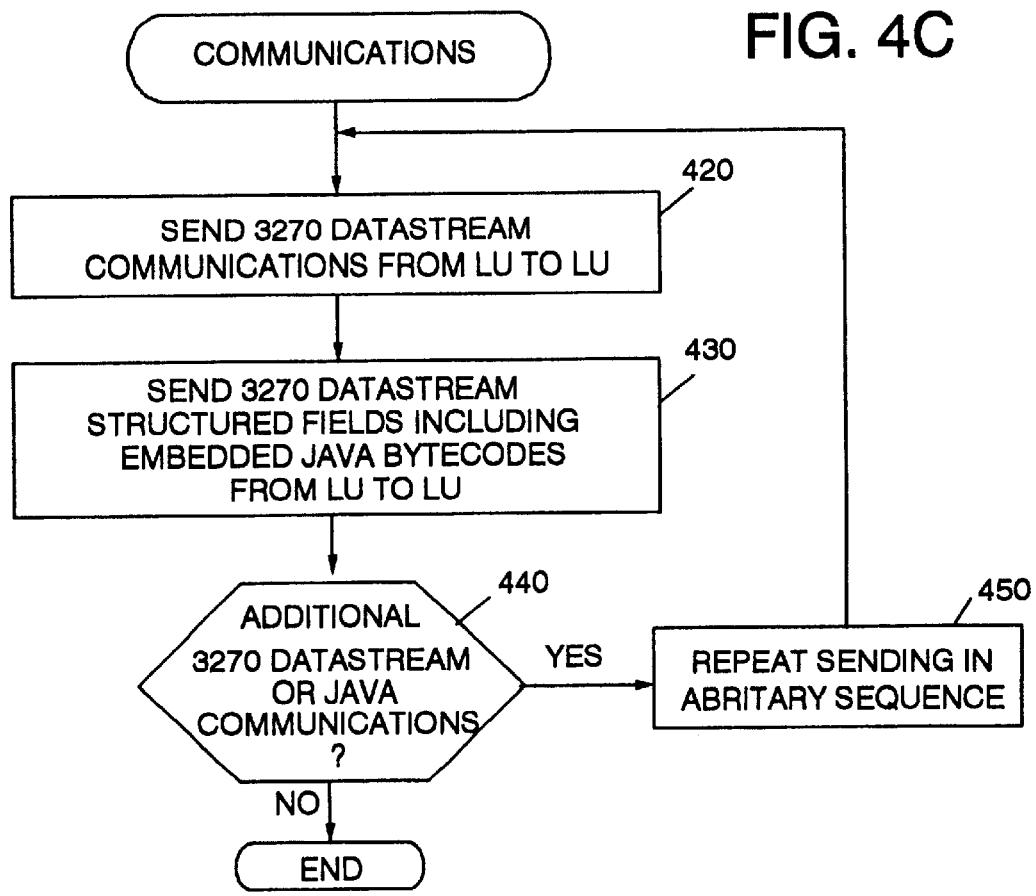
FIG. 4C is a flowchart illustrating generalized communications between Logical Units according to the present invention.
Figure 4A:
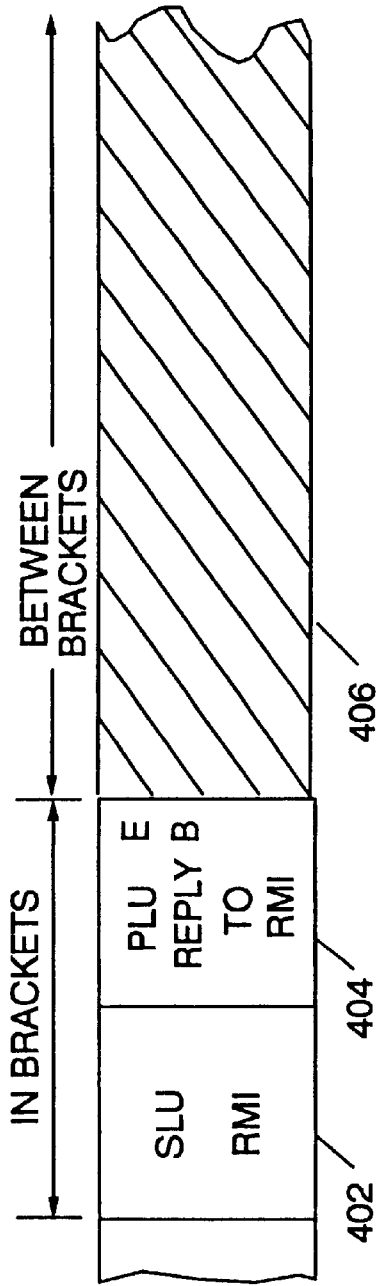
FIGS. 4A and 4B depict synchronous communications and asynchronous communications, respectively, according to the present invention.

FIG. 4A depicts synchronous communications wherein a complete remote method invocation (RMI)—a request 402 by a JVM co-located with one LU and a reply 404 by second JVM co-located with a second LU—takes place during a single bracket. Reference number 406 indicates the session is between brackets. The communication is said to be synchronous because the first JVM pauses program execution while waiting for the reply from the second JVM. In this manner various object-handlers, such as JVMs and audio clients and servers, can communicate over a 3270 session quasi-concurrently with the use of the session for conventional 3270 interactions between a host application program and an end user.

Figure 4B:
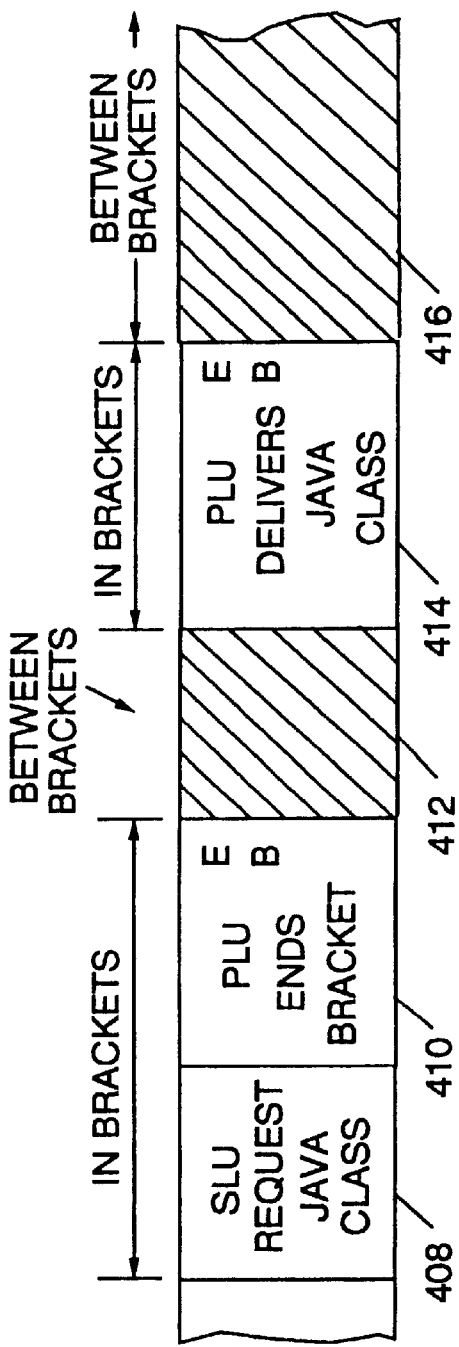

FIG. 4B depicts asynchronous communications wherein a request 408 for a Java class file from a first JVM, co-located with a SLU, is contained within a single bracket 410 ended by the PLU, and is answered by the delivery 414 of the corresponding Java Class file from a second JVM co-located with the PLU, wherein said second message is contained within a different, not necessarily the next sequential, bracket. Reference numbers 412 and 416 indicate the session is between brackets.

As will be explained with reference to FIGS. 5 and 6, LU2 protocol defines certain times when the session state permits the SLU or the PLU to send data to the other. The present invention can identify those times and insert arbitrary data objects encoded in 3270 structured fields in a manner that permits quasi-concurrent use of the session by both the conventional host application-end user interaction and a new interaction between object-handlers such as two JVMs. For example, either an SLU or a PLU can initiate a synchronous communication such as 402, or an asynchronous communication such as 408–410 or 414, whenever the session is between brackets, such as at time 308, 314, 316 or 330, without disturbing the flow of conventional 3270 interactions. An SLU can also initiate an asynchronous communication such as 408 during time intervals 304, 310 or 318–322 when the session is in brackets, the SLU has permission to send, and the SLU has not yet sent Change Direction yielding control of the session to the PLU. A PLU can initiate an asynchronous communication such as 414 during time intervals 302, 306, 312 or 324–328 when the session is in brackets, the PLU has permission to send, and the PLU has not yet yielded control of the session by sending Change Direction.

Generalized communications between a PLU and an SLU are described in connection with FIG. 4C. As shown in FIG. 4C, communications take place by sending 3270 datastream communications between the PLU and the SLU over the network using 3270 datastream architecture at Block 420. These are conventional 3270 datastream communications such as were described in FIGS. 3A and 3B. At Block 430, 3270 datastream structured fields including embedded objects, including but not limited to Java bytecodes, are sent between the PLU and the SLU over the network using 3270 datastream architecture. These structured fields may be sent using communications that were described in connection with FIGS. 4A and 4B and that will be described in further detail below.

If additional 3270 datastream communications or Java communications are desired to be sent at Block 440, then as shown at Block 450, the sending of 3270 datastream communications (Block 420) and the sending of 3270 datastream structured fields including embedded Java bytecodes (Block 430) are repeatedly performed in arbitrary sequence.

Figure 5B:
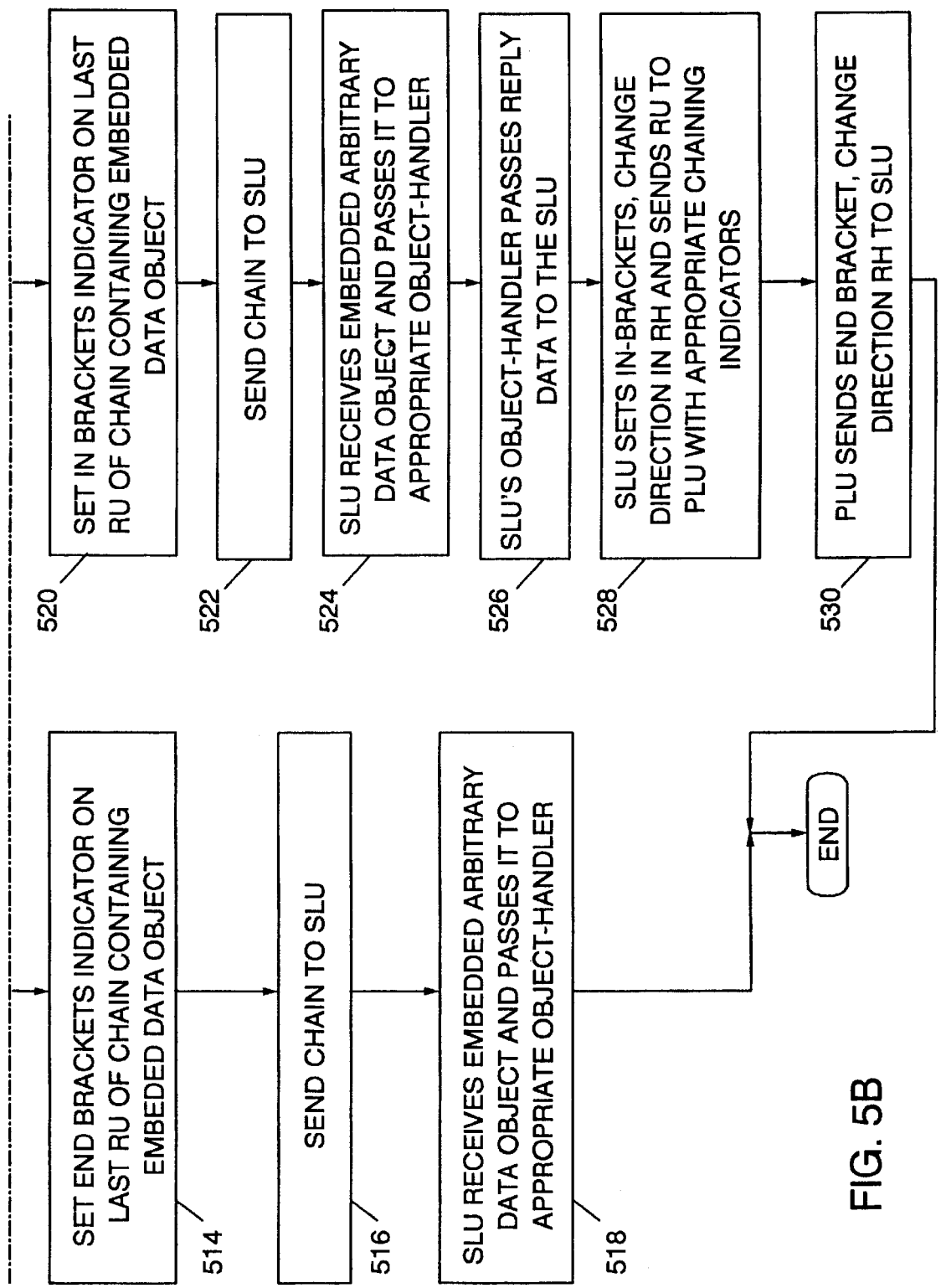
FIG. 5 is a flowchart illustrating PLU-initiated synchronous and asynchronous communications wherein an object-handler, including but not limited to a Java Virtual Machine (JVM), co-located with the PLU, passes arbitrary object data, including but not limited to Java bytecodes and Java Remote Method Protocol, over a 3270 session that is being used quasi-concurrently for legacy 3270 communications, to a peer object-handler co-located with the SLU, and optionally for the SLU's object-handler to send a synchronous reply.

FIG. 5 is a flowchart illustrating overall operations for PLU-initiated synchronous and asynchronous communications according to the present invention. Asynchronous communications support an asynchronous programming model in which an object-handler, including but not limited to a JVM, co-located with the PLU, passes arbitrary object data, including but not limited to Java bytecodes and Java Remote Method Protocol, over a 3270 session that is being used quasi-concurrently for legacy 3270 communications, to a peer object-handler co-located with the SLU, without either object-handler having to stop program execution to wait for a reply from the other. This is an efficient programming model that can allow the program to perform other tasks while waiting for the results of communications. Synchronous communications support a synchronous programming model in which the object-handler, co-located with the PLU, pauses program execution while waiting for the SLU object-handler's reply. The present invention can support both the synchronous and asynchronous programming models, so that Java applets and other types of programs written for other environments can be used within a legacy 3270 environment without modification.

The operations illustrated in FIG. 5 may be invoked when the PLU's object-handler passes arbitrary object data to the PLU in Block 502. The signal from the object-handler to the PLU includes a reply-expected to indicator that will be tested in Block 512. In Block 504, the PLU waits until the session is between brackets, or is in brackets and the PLU has permission to send. The PLU then embeds the object data in a chain including at least one request/response unit (RU) at Block 506. A request/response unit and all the various indicators contained within its request/reply header (RH) are described in the above-cited IBM manual. The at least one RU contains at least one 3270 datastream structured field with at least one object embedded therein.

There are a number of events that could give rise to the PLU having permission to send. For example, the PLU could have permission to send by virtue of the Change Direction indicator having been set on the RH of the last RU received from the SLU. Alternatively, the PLU could have been in brackets, in the process of sending legacy 3270 data to the SLU, but had not yet ended the bracket before the co-located object-handler passed it new object data to be transmitted. When one of the Block 504 conditions is true, in Block 508 the PLU tests whether the session is in brackets. If not, in Block 510 the PLU sets the Begin Bracket indicator to 1 (otherwise, the Begin Bracket indicator is 0 to indicate "In Brackets") in the RH of the first RU of the chain containing the embedded object data. It will be understood by one skilled in the art that the sending of a chain in Block 510 may be repeated arbitrarily using any valid combination of bracket and change direction indicators until all the PLU data has been sent.

In Block 512, the PLU tests the reply-expected indicator to determine if it should expect a synchronous reply to the data object it is about to send. If no reply is expected, in Block 514, the PLU sets the End Bracket indicator on the last RU of the chain containing the embedded data object. In Block 516, the PLU sends the chain to the SLU. In Block 518, the SLU receives the embedded arbitrary data object and passes it to the appropriate type of object-handler, as sent forth in the related application filed concurrently herewith, whereupon the operations end.

Alternatively, if in Block 512 the PLU expects a synchronous reply to the data object chain, in Block 520, the PLU leaves the End Bracket indication at zero (indicating "In Brackets") on the last RU of the chain containing the embedded data object and in Block 522 sends the chain to the SLU. In Block 524, the SLU receives the embedded arbitrary data object and passes it to the appropriate object-handler. In Block 526, the SLU's object-handler creates and passes reply data to the SLU for transmission back to the peer object handler co-located with the PLU.

Because of the asymmetry in standard LU2 protocols, the operation for the SLU to send a chained RU the PLU, shown in Block 528, is different from the PLU's sending operation previously described in Block 510. The SLU creates a chain of at least one RU to send to the PLU, containing at least one 3270 datastream structured field with arbitrary object data therein. In the RH of the chain, along with the appropriate chaining indicators, the SLU sets the Begin Brackets, End Brackets indicators to (0,0), indicating In Brackets, and the Change Direction indicator.

In Block 530, upon receipt, the PLU sends an End Bracket, Change Direction RH to the SLU, allowing the SLU to continue sending any additional chain elements, shown by looping back to Block 528. Alternatively, if the chain had only one RU, operations end, allowing the session to return to a neutral Between Brackets state in which either standard legacy 3270 operations, or the synchronous or asynchronous sending of arbitrary object data inside 3270 datastream structured fields, may occur. It will be understood that since the SLU may discard an entire chain and send a negative response if it wins a bracket contention, the object-handler co-located with the PLU should be prepared to resend any object data if a transmission is rejected for this reason. To avoid the need for this error recovery logic, the object-handler co-located with the PLU can request permission to begin a bracket using BID. If it receives a positive response, it may begin a bracket with the assurance that it will not be interrupted due to bracket contention.

SLU initiated synchronous and asynchronous communications will now be described with reference to FIG. 6. In Block 605, the SLU's object-handler and/or conventional 3720 Presentation Services (PS) passes data to the SLU. These operations may be performed asynchronously by placing the data on a work queue that the SLU inspects whenever it has an opportunity. The SLU encodes any object data on its work queue into one or more structured fields. Using the 2-bit "Group" field in the structured field header, the SLU marks the first structured field First in Message (FIM), any middle SFs Middle in Message (MIM), and the last SF Last in Message (LIM). The SLU performs conventional 3270 preprocessing on any conventional 3270 data in its work queue. The SLU waits until the session is between brackets (BETB), or in brackets (INB) and the SLU has permission to send.

In Block 610, the SLU checks the length of each work item. If the item is smaller than the maximum RU size, Block 620 is executed next. Otherwise, the SLU converts each over-length item into a chain of Request Units (RUs). In Block 620, the SLU fetches the next chain that is ready to send. In Block 625, the SLU tests whether the session is between brackets (BETB). If so, the SLU next executes Block 635. Otherwise, in Block 630, it sets the Begin Brackets (BB) indicator in the Request Header (RH) of the first element in the chain. In Block 635, it sets the Change Direction (CD) indicator on the last element in the chain and sends the entire chain to the PLU. It then receives a chain from the PLU granting permission to send. As will be understood by those skilled in the art, this chain granting permission to send may indicate, for example, In Brackets Change Direction or End Brackets Change Direction, and its RU may be null, a structured field message, or conventional 3270 data. In Block 640, the SLU then tests whether it has more to send. If so, it loops back to Block 620. Otherwise, Block 650 in FIG. 6B is then executed.

In Block 650, the PLU passes received object data embedded in structured fields to the appropriate PLU object-handler, and any conventional 3270 data to a conventional data handler. If in Block 655 the object data does not call for a synchronous reply, operations end. Otherwise, in Block 660, the PLU object-handler passes reply data to the PLU. The PLU encodes any data exceeding the structured field length limit as multiple SFs; otherwise, it encodes the data in a single SF. Using the 2-bit "group" field in the structured field header, the PLU marks the first SF FIM, any middle ones MIM, and the last one LIM. Before transmitting, the PLU converts any over-length item into a chain of RUs.

In Block 665, the PLU fetches the next chain to send. In Block 670, it tests whether the session is between brackets. If not, it sets Begin Bracket (BB) on the first element of the chain. Otherwise, it proceeds directly to Block 680, where it sets End Bracket on the last element in the chain and sends the chain to the SLU. In Block 685, the PLU tests whether it has more data to send. If so, it loops back to Block 665.

In Block 690, the SLU passes object data from embedded structured fields to the appropriate SLU object handler, and any conventional 3270 data to 3270 Presentation Services.

The operations from Block 502 through and including Block 518, and from Block 605 through and including Block 650 but excluding Blocks 655–690, may both be referred to as "asynchronous communications" because execution of the object-handler program co-located with the LU need not stop and wait for a reply from the other LU, and may take place at any time with reference to a sequence of conventional 3270 datastream interactions, as long as the initial conditions permitting such transmission to begin (Blocks 504 or 605, respectively) are satisfied. Either of these asynchronous communications procedures could be used to transmit a "request", a "reply", or merely data, from an object-handler to its peer co-located at the other LU.

Figure 9:
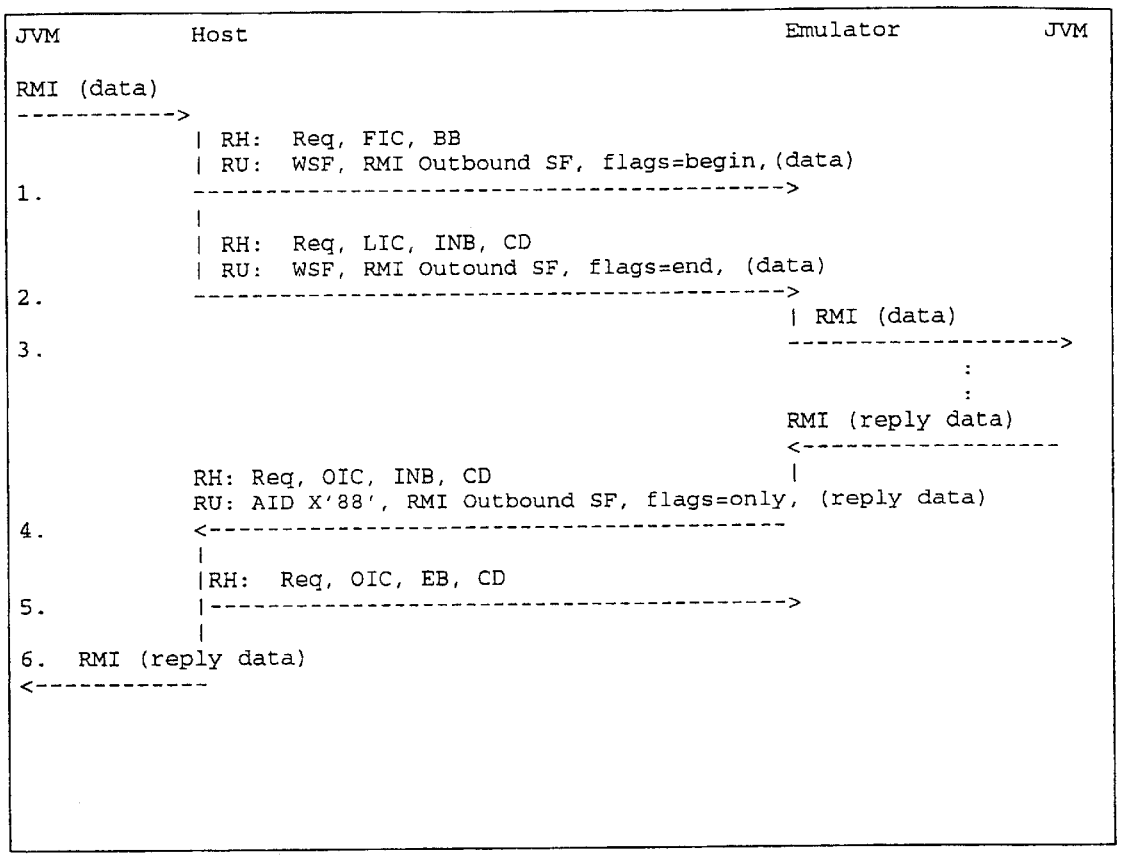

FIG. 8 illustrates synchronous communication flows using LU2 protocol 10 from the SLU and the PLU, as was described generally in FIG. 6. FIG. 9 illustrates synchronous communication flows from the PLU (host) to the SLU (emulator), as was generally described in FIG. 5.

Figure 10:
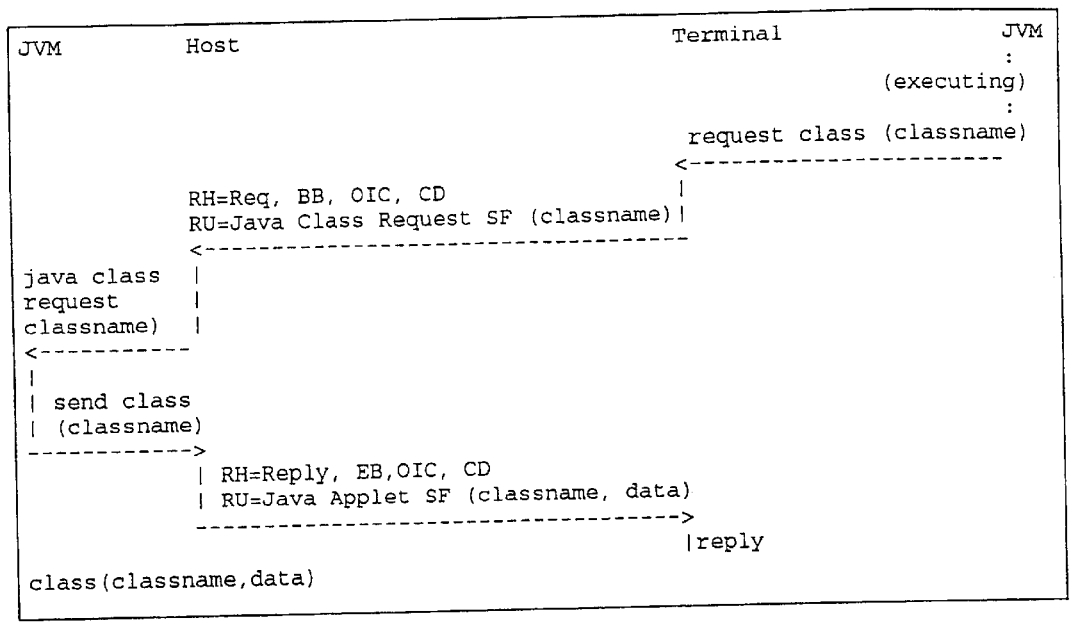

It will be understood that the arbitrary object data can be a request for a Java class file and the reply can be the Java class file bytecodes. This request is generally initiated by the secondary LU, where the object-handler co-located at the SLU is a Java client and the object-handler is co-located at the PLU is a Java server. An example flow is illustrated in FIG. 10, wherein the secondary logical unit is referred to as a "terminal".

Figure 11:
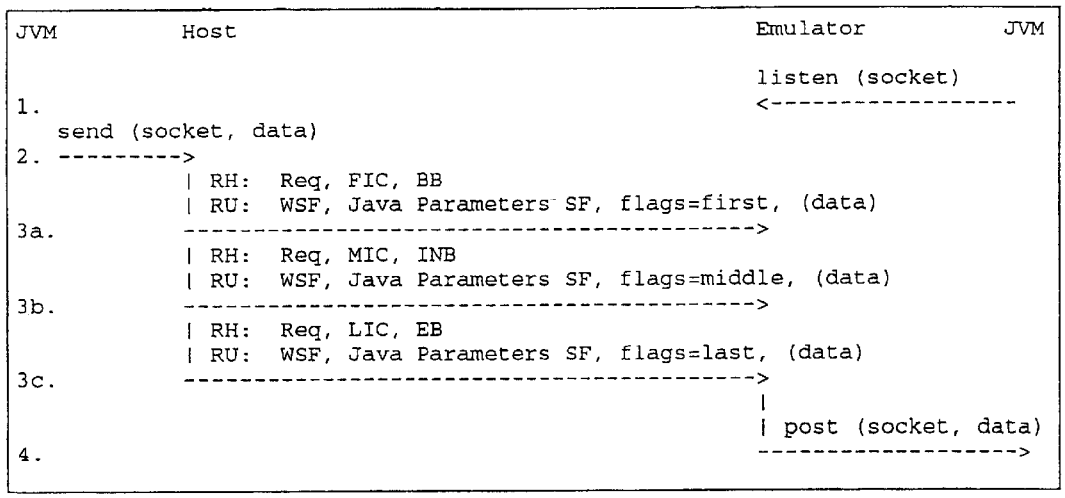

FIG. 11 illustrates asynchronous communication flows of FIG. 6 initiated by the SLU (referred to as an emulator). FIG. 12 illustrates asynchronous communication flows of FIG. 5, where the asynchronous communications are initiated by the PLU.

The passing of streaming audio from a server co-located with a PLU to a client co-located with an SLU that communicate with each other over a network using 3270 datastream architecture will now be described in connection with FIG. 7. If sufficient bandwidth and processing resources are available, it is possible for the host to send streaming audio on a 3270 session. Streaming audio will generally be a series of short packets, sent at quasi-regular intervals, with an aggregate bandwidth generally between 2400 bps and 64 kbps. Standard voice compression coding can be used. These standards include, but are not limited to the International Telecommunications Union's G.711 for 64 kbps PCM coding, G.726 for 32 kbps ADPCM, or one of the standards that use Linear Predictive Coding (G.728, G.729 or G.723). Audio compression at 2400 bps may produce acceptable results.

In conventional use of these standards for interactive conversation, a delay may be introduced by end point compression/decompression processing. However, for 3270 datastream communications, streaming audio is generally sent in only one direction by the audio server at the PLU for playback by the audio client at the secondary LU. With sufficient buffering, for example 15 seconds, large amounts of jitter caused by contending 3270 sessions can be accommodated.

Figure 7:
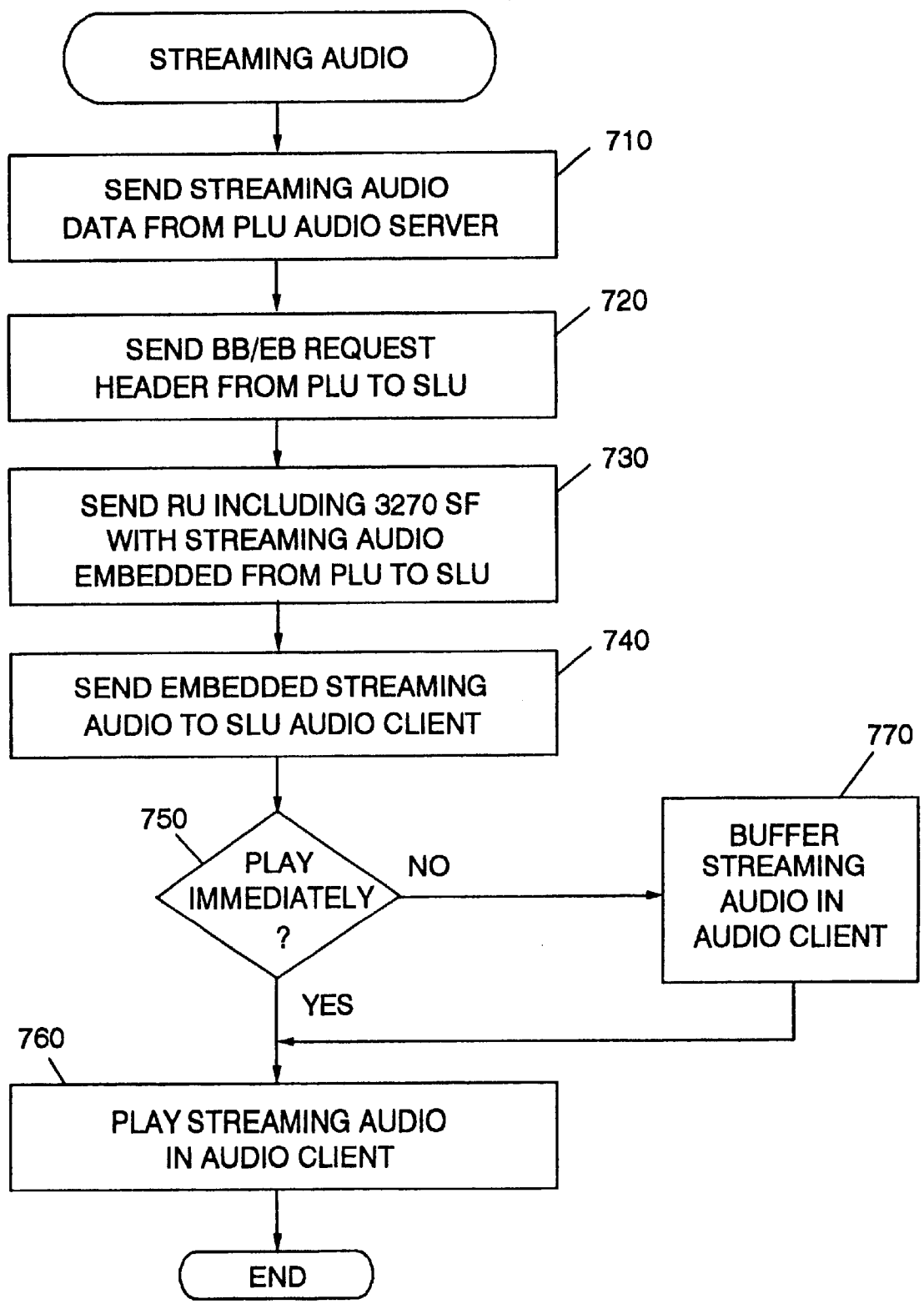
FIG. 7 is a flowchart illustrating sending of streaming audio according to the present invention.

Referring now to FIG. 7, streaming audio is sent by first sending streaming audio from the audio server to the PLU at Block 710. A Begin Bracket/End Bracket (BB/EB) request header is sent from the PLU to the SLU at Block 720. At Block 730, a single request unit (RU) including a 3270 datastream structured field with streaming audio embedded therein is sent from the PLU to the SLU. Then, at Block 730, the embedded streaming audio is sent from the secondary LU to the audio client. Those skilled in the art will understand that the operations indicated by Blocks 720 and 730 are generally combined in a single transmission. The 3270 datastream structured field may include a "Play Immediately" flag. If the "Play Immediately" flag is set at Block 750, then at Block 760, the streaming audio is played in the second JVM. If not, then the streaming audio is buffered in the second JVM at Block 770 and is later played.

Accordingly, the primary LU sends a stream of individual audio data structured field packets with the "Play Immediately" indicator set. While the audio is streaming, normal half-duplex flip-flop protocols generally do not operate, because the audio sender generally cannot put itself into a receive state and stop sending while waiting for the secondary logical unit user to interact with the 3270 stream. However, the legacy 3270 user should be allowed to enter a key and stop the audio at will.

Therefore, each streaming audio data structured field is sent in its own RU with Begin Bracket, End Bracket, only in segment, no response requested indicators. Between packets, the session is preferably between brackets, permitting interruption by the legacy 3270 user. Lost audio packets do not need to be retransmitted. FIG. 13 illustrates communication flows for sending streaming audio as was described in FIG. 7. Accordingly, arbitrary data objects can be communicated between 3270 logical units using 3270 datastream architecture.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for passing Java bytecodes from a first Java Virtual Machine (JVM) in a Primary Logical Unit (PLU) to a second JVM in a Secondary Logical Unit (SLU) that communicate with each other over a network using 3270 datastream architecture, the method comprising the steps of:

sending Java bytecodes from the first JVM to the corresponding PLU;

waiting until a 3270 communications session between the PLU and the SLU is between brackets, or is in brackets and the PLU has permission to send;

if the session is between brackets, sending a Begin Brackets request header from the PLU to the SLU;

sending at least one request unit from the PLU to the SLU, the at least one request unit containing a 3270 datastream structured field with the Java bytecodes embedded therein; and sending the embedded Java bytecodes from the SLU to the second JVM.

2. A method according to claim 1:

wherein the step of sending at least one request unit from the PLU to the SLU, the at least one request unit containing a 3270 datastream structured field with the Java bytecodes embedded therein, comprises the step of setting an In Brackets indicator in a last of the at least one request unit containing a 3270 datastream structured field with the Java bytecodes embedded therein, if a synchronous reply to the Java bytecodes is expected; and wherein the step of sending the embedded Java bytecodes from the SLU to the second JVM is followed by the steps of:

sending reply Java bytecodes from the second JVM to the SLU;

sending an In Brackets, Change Direction request header from the SLU to the PLU;

sending at least one request unit from the SLU to the PLU, the at least one request unit containing a 3270 datastream structured field with the reply Java bytecodes embedded therein; and sending the embedded reply Java bytecodes from the PLU to the corresponding first JVM.

3. A method according to claim 2 wherein the step of sending at least one request unit from the SLU to the PLU, the at least one request unit containing a 3270 datastream structured field with the reply Java bytecodes embedded therein, is followed by the step of:

sending an End Brackets, Change Direction request header from the PLU to the SLU.

4. A method according to claim 2 wherein the Java bytecodes are a request for a Java class file and wherein the reply Java bytecodes are a Java applet corresponding to the Java class file.

5. A method according to claim 1:

wherein the step of sending at least one request unit from the PLU to the SLU, the at least one request unit containing a 3270 datastream structured field with the Java bytecodes embedded therein, comprises the step of setting an End Brackets indicator in a last of the at least one request unit containing a 3270 datastream structured field with the Java bytecodes embedded therein, if a synchronous reply to the Java bytecodes is not expected.

6. A method according to claim 1 wherein the step of sending at least one request unit from the PLU to the SLU, the at least one request unit containing a 3270 datastream structured field with the Java bytecodes embedded therein, comprises the step of:

sequentially sending a plurality of chained request units from the PLU to the SLU, the plurality of chained request units containing the 3270 datastream structured field with the Java bytecodes embedded therein.

7. A method for passing Java bytecodes from a second Java Virtual Machine (JVM) in a Secondary Logical Unit (SLU) to a first JVM in a Primary Logical Unit (PLU) that communicate with each other over a network using 3270 datastream architecture, the method comprising the steps of:

sending Java bytecodes from the second JVM to the corresponding SLU;

waiting until a 3270 communications session between the PLU and the SLU is in brackets and the SLU has permission to send;

sending a Begin Brackets, Change Direction request header from the SLU to the PLU;

sending a chain from the SLU to the PLU, the chain containing a 3270 datastream structured field with at least some of the Java bytecodes embedded therein;

if the chain does not contain all of the Java bytecodes embedded therein, sending a Change Direction request header from the PLU to the SLU;

if the chain does not contain all of the Java bytecodes embedded therein, repeating the step of sending a Change Direction request header and the step of sending a chain from the SLU to the PLU, until all the embedded Java bytecodes have been sent from the SLU to the PLU; and sending the embedded Java bytecodes from the PLU to the first JVM after all the embedded Java bytecodes have been sent from the SLU to the PLU.

8. A method according to claim 7 wherein the step of sending the embedded Java bytecodes from the PLU to the first JVM after all the embedded Java bytecodes have been sent from the SLU to the PLU, is followed by the following steps if a synchronous reply to the embedded Java bytecodes is expected:

sending reply Java bytecodes from the first JVM to the PLU;

sending an End Brackets chain from the PLU to the SLU;

sending at least one chain from the PLU to the SLU, the at least one chain containing a 3270 datastream structured field with the reply Java bytecodes embedded therein; and sending the embedded reply Java bytecodes from the SLU to the corresponding second JVM.

9. A method according to claim 8 wherein the Java bytecodes are a request for a Java class file and wherein the reply Java bytecodes are a Java applet corresponding to the Java class file.

10. A method for passing streaming audio from an audio server in a Primary Logical Unit (PLU) to an audio client in a Secondary Logical Unit (SLU) that communicate with each other over a network using 3270 datastream architecture, the method comprising the steps of:

sending streaming audio from the audio server to the PLU;

sending a Begin Brackets/End Brackets request header from the PLU to the SLU;

sending a single request unit from the PLU to the SLU, the single request unit containing a 3270 datastream structured field with the streaming audio embedded therein;

sending the embedded streaming audio from the SLU to the audio client; and playing the streaming audio in the audio client.

11. A method according to claim 10 wherein the following steps are performed between the steps of sending streaming audio from the audio server to the PLU, and sending a Begin Brackets/End Brackets request header from the PLU to the SLU:

sending a request header from the SLU to the PLU; and sending a request unit from the SLU to the PLU, the request unit containing a 3270 datastream therein.

12. A method for communicating between a Primary Logical Unit (PLU) and a Secondary Logical Unit (SLU) that communicate with each other over a network using 3270 datastream architecture, the method comprising the steps of:

sending 3270 datastream communications between the PLU and the SLU over the network using 3270 datastream architecture;

sending 3270 datastream structured fields including embedded Java bytecodes between the PLU and the SLU over the network using 3270 datastream architecture; and repeatedly performing the step of sending 3270 datastream communications and the step of sending 3270 datastream structured fields, in an arbitrary sequence, to thereby send 3270 datastreams and Java bytecodes between the PLU and the SLU over the network using 3270 datastream architecture.

13. A method according to claim 12 wherein the Java bytecodes are a Java applet.

14. A system for passing Java bytecodes from a first Java Virtual Machine (JVM) in a Primary Logical Unit (PLU) to a second JVM in a Secondary Logical Unit (SLU) that communicate with each other over a network using 3270 datastream architecture, the system comprising:

means for sending Java bytecodes from the first JVM to the corresponding PLU;

means for waiting until a 3270 communications session between the PLU and the SLU is between brackets, or is in brackets and the PLU has permission to send;

means for sending a Begin Brackets request header from the PLU to the SLU if the session is between brackets;

means for sending at least one request unit from the PLU to the SLU, the at least one request unit containing a 3270 datastream structured field with the Java bytecodes embedded therein; and means for sending the embedded Java bytecodes from the SLU to the second JVM.

15. A system according to claim 14:

wherein the means for sending at least one request unit from the PLU to the SLU, the at least one request unit containing a 3270 datastream structured field with the Java bytecodes embedded therein, comprises means for setting an In Brackets indicator in a last of the at least one request unit containing a 3270 datastream structured field with the Java bytecodes embedded therein, if a synchronous reply to the Java bytecodes is expected; and wherein the system further comprises:

means for sending reply Java bytecodes from the second JVM to the SLU;

means for sending an In Brackets, Change Direction request header from the SLU to the PLU;

means for sending at least one request unit from the SLU to the PLU, the at least one request unit containing a 3270 datastream structured field with the reply Java bytecodes embedded therein; and means for sending the embedded reply Java bytecodes from the PLU to the corresponding first JVM.

16. A system according to claim 15 further comprising:

means for sending an End Brackets, Change Direction request header from the PLU to the SLU.

17. A system according to claim 15 wherein the Java bytecodes are a request for a Java class file and wherein the reply Java bytecodes are a Java applet corresponding to the Java class file.

18. A system according to claim 14:

wherein the means for sending at least one request unit from the PLU to the SLU, the at least one request unit containing a 3270 datastream structured field with the Java bytecodes embedded therein, comprises means for setting an End Brackets indicator in a last of the at least one request unit containing a 3270 datastream structured field with the Java bytecodes embedded therein, if a synchronous reply to the Java bytecodes is not expected.

19. A system according to claim 14 wherein the means for sending at least one request unit from the PLU to the SLU, the at least one request unit containing a 3270 datastream structured field with the Java bytecodes embedded therein, comprises:

means for sequentially sending a plurality of chained request units from the PLU to the SLU, the plurality of chained request units containing the 3270 datastream structured field with the Java bytecodes embedded therein.

20. A system for passing Java bytecodes from a second Java Virtual Machine (JVM) in a Secondary Logical Unit (SLU) to a first JVM in a Primary Logical Unit (PLU) that communicate with each other over a network using 3270 datastream architecture, the system comprising:

means for sending Java bytecodes from the second JVM to the corresponding SLU;

means for waiting until a 3270 communications session between the PLU and the SLU is in brackets and the SLU has permission to send;

means for sending a Begin Brackets, Change Direction request header from the SLU to the PLU;

means for sending a chain from the SLU to the PLU, the chain containing a 3270 datastream structured field with at least some of the Java bytecodes embedded therein;

means for sending a Change Direction request header from the PLU to the SLU if the chain does not contain all of the Java bytecodes embedded therein;

means for repeatedly sending a Change Direction request header and repeatedly sending a chain from the SLU to the PLU, until all the embedded Java bytecodes have been sent from the SLU to the PLU if the chain does not contain all of the Java bytecodes embedded therein; and means for sending the embedded Java bytecodes from the PLU to the first JVM after all the embedded Java bytecodes have been sent from the SLU to the PLU.

21. A system according to claim 20 further comprising:

means for sending reply Java bytecodes from the first JVM to the PLU if a synchronous reply to the embedded Java bytecodes is expected;

means for sending an End Brackets chain from the PLU to the SLU;

means for sending at least one chain from the PLU to the SLU, the at least one chain containing a 3270 datastream structured field with the reply Java bytecodes embedded therein; and means for sending the embedded reply Java bytecodes from the SLU to the corresponding second JVM.

22. A system according to claim 21 wherein the Java bytecodes are a request for a Java class file and wherein the reply Java bytecodes are a Java applet corresponding to the Java class file.

23. A system for passing streaming audio from an audio server in a Primary Logical Unit (PLU) to an audio client in a Secondary Logical Unit (SLU) that communicate with each other over a network using 3270 datastream architecture, the system comprising:

means for sending streaming audio from the audio server to the PLU;

means for sending a Begin Brackets/End Brackets request header from the PLU to the SLU;

means for sending a single request unit from the PLU to the SLU, the single request unit containing a 3270 datastream structured field with the streaming audio embedded therein;

means for sending the embedded streaming audio from the SLU to the audio client; and means for playing the streaming audio in the audio client.

24. A system according to claim 23 further comprising:

means for sending a request header from the SLU to the PLU; and means for sending a request unit from the SLU to the PLU, the request unit containing a 3270 datastream therein.

25. A computer program product for passing Java bytecodes from a first Java Virtual Machine (JVM) in a Primary Logical Unit (PLU) to a second JVM in a Secondary Logical Unit (SLU) that communicate with each other over a network using 3270 datastream architecture, the computer program product comprising a computer-readable storage medium having computer-readable program code means embodied in the medium, the computer-readable program code means comprising:

computer-readable program code means for sending Java bytecodes from the first JVM to the corresponding PLU;

computer-readable program code means for waiting until a 3270 communications session between the PLU and the SLU is between brackets, or is in brackets and the PLU has permission to send;

computer-readable program code means for sending a Begin Brackets request header from the PLU to the SLU if the session is between brackets;

computer-readable program code means for sending at least one request unit from the PLU to the SLU, the at least one request unit containing a 3270 datastream structured field with the Java bytecodes embedded therein; and computer-readable program code means for sending the embedded Java bytecodes from the SLU to the second JVM.

26. A computer program product according to claim 25:

wherein the computer-readable program code means for sending at least one request unit from the PLU to the SLU, the at least one request unit containing a 3270 datastream structured field with the Java bytecodes embedded therein, comprises the computer-readable program code means for setting an In Brackets indicator in a last of the at least one request unit containing a 3270 datastream structured field with the Java bytecodes embedded therein, if a synchronous reply to the Java bytecodes is expected; and wherein the computer program product further comprises:

computer-readable program code means for sending reply Java bytecodes from the second JVM to the SLU;

computer-readable program code means for sending an In Brackets, Change Direction request header from the SLU to the PLU;

computer-readable program code means for sending at least one request unit from the SLU to the PLU, the at least one request unit containing a 3270 datastream structured field with the reply Java bytecodes embedded therein; and computer-readable program code means for sending the embedded reply Java bytecodes from the PLU to the corresponding first JVM.

27. A computer program product according to claim 26 further comprising:

computer-readable program code means for sending an End Brackets, Change Direction request header from the PLU to the SLU.

28. A computer program product according to claim 26 wherein the Java bytecodes are a request for a Java class file and wherein the reply Java bytecodes are a Java applet corresponding to the Java class file.

29. A computer program product according to claim 25:

wherein the computer-readable program code means for sending at least one request unit from the PLU to the SLU, the at least one request unit containing a 3270 datastream structured field with the Java bytecodes embedded therein, comprises computer-readable program code means for setting an End Brackets indicator in a last of the at least one request unit containing a 3270 datastream structured field with the Java bytecodes embedded therein, if a synchronous reply to the Java bytecodes is not expected.

30. A computer program product according to claim 25 wherein the computer-readable program code means for sending at least one request unit from the PLU to the SLU, the at least one request unit containing a 3270 datastream structured field with the Java bytecodes embedded therein, comprises:

computer-readable program code means for sequentially sending a plurality of chained request units from the PLU to the SLU, the plurality of chained request units containing the 3270 datastream structured field with the Java bytecodes embedded therein.

31. A computer program product for passing Java bytecodes from a second Java Virtual Machine (JVM) in a Secondary Logical Unit (SLU) to a first JVM in a Primary Logical Unit (PLU) that communicate with each other over a network using 3270 datastream architecture, the computer program product comprising a computer-readable storage medium having computer-readable program code means embodied in the medium, the computer-readable program means comprising:
- computer-readable program code means for sending Java bytecodes from the second JVM to the corresponding SLU;
- computer-readable program code means for waiting until a 3270 communications session between the PLU and the SLU is in brackets and the SLU has permission to send;
- computer-readable program code means for sending a Begin Brackets, Change Direction request header from the SLU to the PLU;
- computer-readable program code means for sending a chain from the SLU to the PLU, the chain containing a 3270 datastream structured field with at least some of the Java bytecodes embedded therein,
- computer-readable program code means for sending a Change Direction request header from the PLU to the SLU if the chain does not contain all of the Java bytecodes embedded therein;
- computer-readable program code means for repeatedly sending a Change Direction request header and repeatedly sending a chain from the SLU to the PLU, until all the embedded Java bytecodes have been sent from the SLU to the PLU if the request unit does not contain all of the Java bytecodes embedded therein; and
- computer-readable program code means for sending the embedded Java bytecodes from the PLU to the first JVM after all the embedded Java bytecodes have been sent from the SLU to the PLU.

32. A computer program product according to claim 31 further comprising:
- computer-readable program code means for sending reply Java bytecodes from the first JVM to the PLU if a synchronous reply to the embedded Java bytecodes is expected;
- computer-readable program code means for sending an End Brackets chain from the PLU to the SLU;
- computer-readable program code means for sending at least one chain from the PLU to the SLU, the at least one chain containing a 3270 datastream structured field with the reply Java bytecodes embedded therein; and
- computer-readable program code means for sending the embedded reply Java bytecodes from the SLU to the corresponding second JVM.

33. A computer program product according to claim 32 wherein the Java bytecodes are a request for a Java class file and wherein the reply Java bytecodes are a Java applet corresponding to the Java class file.

34. A computer program product for passing streaming audio from an audio server in a Primary Logical Unit (PLU) to an audio client in a Secondary Logical Unit (SLU) that communicate with each other over a network using 3270 datastream architecture, the computer program product comprising a computer-readable storage medium having computer-readable program code means embodied in the medium, the computer-readable program code means comprising:
- computer-readable program code means for sending streaming audio from the audio server to the PLU;
- computer-readable program code means for sending a Begin Brackets/End Brackets request header from the PLU to the SLU;
- computer-readable program code means for sending a single request unit from the PLU to the SLU, the single request unit containing a 3270 datastream structured field with the streaming audio embedded therein;
- computer-readable program code means for sending the embedded streaming audio from the SLU to the audio client; and
- computer-readable program code means for playing the streaming audio in the audio client.

35. A computer program product according to claim 34 further comprising:
- computer-readable program code means for sending a request header from the SLU to the PLU; and
- computer-readable program code means for sending a request unit from the SLU to the PLU, the request unit containing a 3270 datastream therein.

36. A method for passing objects from a first object handler in a Primary Logical Unit (PLU) to a second object handler in a Secondary Logical Unit (SLU) that communicate with each other over a network using 3270 datastream architecture, the method comprising the steps of:
- sending an object from the first object handler to the corresponding PLU;
- waiting until a 3270 communications session between the PLU and the SLU is between brackets, or is in brackets and the PLU has permission to send;
- if the session is between brackets, sending a Begin Brackets request header from the PLU to the SLU;
- sending at least one request unit from the PLU to the SLU, the at least one request unit containing a 3270 datastream structured field with the object embedded therein; and
- sending the embedded object from the SLU to the second object handler.

37. A method according to claim 36:
- wherein the step of sending at least one request unit from the PLU to the SLU, the at least one request unit containing a 3270 datastream structured field with the object embedded therein, comprises the step of setting an In Brackets indicator in a last of the at least one request unit containing a 3270 datastream structured field with the object embedded therein, if a synchronous reply to the object is expected; and
- wherein the step of sending the embedded object from the SLU to the second object handler is followed by the steps of:
  - sending a reply object from the second object handler to the SLU;
  - sending an In Brackets, Change Direction request header from the SLU to the PLU;
  - sending at least one request unit from the SLU to the PLU, the at least one request unit containing a 3270 datastream structured field with the reply object embedded therein; and
  - sending the embedded reply object from the PLU to the corresponding first object handler.

38. A method according to claim 37 wherein the step of sending at least one request unit from the SLU to the PLU, the at least one request unit containing a 3270 datastream structured field with the reply object embedded therein, is followed by the step of:
- sending an End Brackets, Change Direction request header from the PLU to the SLU.

39. A method according to claim 36:
- wherein the step of sending at least one request unit from the PLU to the SLU, the at least one request unit containing a 3270 datastream structured field with the object embedded therein, comprises the step of setting an End Brackets indicator in a last of the at least one request unit containing a 3270 datastream structured field with the object embedded therein, if a synchronous reply to the object is not expected.

40. A method according to claim 36 wherein the step of sending at least one request unit from the PLU to the SLU, the at least one request unit containing a 3270 datastream structured field with the object embedded therein, comprises the step of:

sequentially sending a plurality of chained request units from the PLU to the SLU, the plurality of chained request units containing the 3270 datastream structured field with the object embedded therein.

41. A method for passing objects from a second object handler in a Secondary Logical Unit (SLU) to a first object handler in a Primary Logical Unit (PLU) that communicate with each other over a network using 3270 datastream architecture, the method comprising the steps of:

sending an object from the second object handler to the corresponding SLU;

waiting until a 3270 communications session between the PLU and the SLU is in brackets and the SLU has permission to send;

sending a Begin Brackets, Change Direction request header from the SLU to the PLU;

sending a chain from the SLU to the PLU, the chain containing a 3270 datastream structured field with at least some of the object embedded therein;

if the chain does not contain all of the object embedded therein, sending a Change Direction request header from the PLU to the SLU;

if the chain does not contain all of the object embedded therein, repeating the step of sending a Change Direction request header and the step of sending a chain from the SLU to the PLU, until all the embedded object has been sent from the SLU to the PLU; and sending the embedded object from the PLU to the first object handler after all the embedded object has been sent from the SLU to the PLU.

42. A method according to claim 41 wherein the step of sending the embedded object from the PLU to the first object handler after all the embedded object has been sent from the SLU to the PLU, is followed by the following steps if a synchronous reply to the embedded object is expected:

sending a reply object from the first object handler to the PLU;

sending an End Brackets chain from the PLU to the SLU;

sending at least one chain from the PLU to the SLU, the at least one chain containing a 3270 datastream structured field with the reply object embedded therein; and sending the embedded reply object from the SLU to the corresponding second object handler.

43. A system for passing objects from a first object handler in a Primary Logical Unit (PLU) to a second object handler in a Secondary Logical Unit (SLU) that communicate with each other over a network using 3270 datastream architecture, the system comprising:

means for sending an object from the first object handler to the corresponding PLU;

means for waiting until a 3270 communications session between the PLU and the SLU is between brackets, or is in brackets and the PLU has permission to send;

means for sending a Begin Brackets request header from the PLU to the SLU if the session is between brackets;

means for sending at least one request unit from the PLU to the SLU, the at least one request unit containing a 3270 datastream structured field with the object embedded therein; and means for sending the embedded object from the SLU to the second object handler.

44. A system according to claim 43;

wherein the means for sending at least one request unit from the PLU to the SLU, the at least one request unit containing a 3270 datastream structured field with the object embedded therein, comprises means for setting an In Brackets indicator in a last of the at least one request unit containing a 3270 datastream structured field with the object embedded therein, if a synchronous reply to the object is expected; and wherein the system further comprises:

means for sending a reply object from the second object handler to the SLU;

means for sending an In Brackets, Change Direction request header from the SLU to the PLU;

means for sending at least one request unit from the SLU to the PLU, the at least one request unit containing a 3270 datastream structured field with the reply object embedded therein; and means for sending the embedded reply object from the PLU to the corresponding first JVM.

45. A system according to claim 44 further comprising:

means for sending an End Brackets, Change Direction request header from the PLU to the SLU.

46. A system according to claim 43:

wherein the means for sending at least one request unit from the PLU to the SLU, the at least one request unit containing a 3270 datastream structured field with the object embedded therein, comprises means for setting an End Brackets indicator in a last of the at least one request unit containing a 3270 datastream structured field with the object embedded therein, if a synchronous reply to the object is not expected.

47. A system according to claim 43 wherein the means for sending at least one request unit from the PLU to the SLU, the at least one request unit containing a 3270 datastream structured field with the object embedded therein, comprises:

means for sequentially sending a plurality of chained request units from the PLU to the SLU, the plurality of chained request units containing the 3270 datastream structured field with the object embedded therein.

48. A system for passing objects from a second object handler in a Secondary Logical Unit (SLU) to a first object handler in a Primary Logical Unit (PLU) that communicate with each other over a network using 3270 datastream architecture, the system comprising:

means for sending an object from the second object handler to the corresponding SLU;

means for waiting until a 3270 communications session between the PLU and the SLU is in brackets and the SLU has permission to send;

means for sending a Begin Brackets, Change Direction request header from the SLU to the PLU;

means for sending a chain from the SLU to the PLU, the chain containing a 3270 datastream structured field with at least some of the object embedded therein;

means for sending a Change Direction request header from the PLU to the SLU if the chain does not contain all of the object embedded therein;

means for repeatedly sending a Change Direction request header and repeatedly sending a chain from the SLU to the PLU, until all the embedded Java bytecodes have been sent from the SLU to the PLU if the chain does not contain all of the Java bytecodes embedded therein; and means for sending the embedded Java bytecodes from the PLU to the first object handler after all the embedded Java bytecodes have been sent from the SLU to the PLU.

49. A system according to claim 48 further comprising:

means for sending a reply object from the first object handler to the PLU if a synchronous reply to the embedded object is expected;

means for sending an End Brackets chain from the PLU to the SLU;

means for sending at least one chain from the PLU to the SLU, the at least one chain containing a 3270 datastream structured field with the reply object embedded therein; and means for sending the embedded reply object from the SLU to the corresponding second object handler.

50. A computer program product for passing objects from a first object handler in a Primary Logical Unit (PLU) to a second object handler in a Secondary Logical Unit (SLU) that communicate with each other over a network using 3270 datastream architecture, the computer program product comprising a computer-readable storage medium having computer-readable program code means embodied in the medium, the computer-readable program code means comprising:

computer-readable program code means for sending an object from the first object handler to the corresponding PLU;

computer-readable program code means for waiting until a 3270 communications session between the PLU and the SLU is between brackets, or is in brackets and the PLU has permission to send;

computer-readable program code means for sending a Begin Brackets request header from the PLU to the SLU if the session is between brackets;

computer-readable program code means for sending at least one request unit from the PLU to the SLU, the at least one request unit containing a 3270 datastream structured field with the object embedded therein; and computer-readable program code means for sending the embedded object from the SLU to the second object handler.

51. A computer program product according to claim 50:

wherein the computer-readable program code means for sending at least one request unit from the PLU to the SLU, the at least one request unit containing a 3270 datastream structured field with the object embedded therein, comprises the computer-readable program code means for setting an In Brackets indicator in a last of the at least one request unit containing a 3270 datastream structured field with the object embedded therein, if a synchronous reply to the object is expected; and wherein the computer program product further comprises:

computer-readable program code means for sending a reply object from the second object handler to the SLU;

computer-readable program code means for sending an In Brackets, Change Direction request header from the SLU to the PLU;

computer-readable program code means for sending at least one request unit from the SLU to the PLU, the at least one request unit containing a 3270 datastream structured field with the reply object embedded therein; and computer-readable program code means for sending the embedded reply object from the PLU to the corresponding first object handler.

52. A computer program product according to claim 51 further comprising:

computer-readable program code means for sending an End Brackets, Change Direction request header from the PLU to the SLU.

53. A computer program product according to claim 50:

wherein the computer-readable program code means for sending at least one request unit from the PLU to the SLU, the at least one request unit containing a 3270 datastream structured field with the object embedded therein, comprises computer-readable program code means for setting an End Brackets indicator in a last of the at least one request unit containing a 3270 datastream structured field with the object embedded therein, if a synchronous reply to the object is not expected.

54. A computer program product according to claim 50 wherein the computer-readable program code means for sending at least one request unit from the PLU to the SLU, the at least one request unit containing a 3270 datastream structured field with the object embedded therein, comprises:

computer-readable program code means for sequentially sending a plurality of chained request units from the PLU to the SLU, the plurality of chained request units containing the 3270 datastream structured field with the object embedded therein.

55. A computer program product for passing objects from a second object handler in a Secondary Logical Unit (SLU) to a first object handler in a Primary Logical Unit (PLU) that communicate with each other over a network using 3270 datastream architecture, the computer program product comprising a computer-readable storage medium having computer-readable program code means embodied in the medium, the computer-readable program means comprising:

computer-readable program code means for sending an object from the second object handler to the corresponding SLU;

computer-readable program code means for waiting until a 3270 communications session between the PLU and the SLU is in brackets and the SLU has permission to send;

computer-readable program code means for sending a Begin Brackets, Change Direction request header from the SLU to the PLU;

computer-readable program code means for sending a chain from the SLU to the PLU, the chain containing a 3270 datastream structured field with at least some of the object embedded therein;

computer-readable program code means for sending a Change Direction request header from the PLU to the SLU if the chain does not contain all of the object embedded therein;

computer-readable program code means for repeatedly sending a Change Direction request header and repeatedly sending a chain from the SLU to the PLU, until all the embedded object has been sent from the SLU to the PLU if the request unit does not contain all of the object embedded therein; and computer-readable program code means for sending the embedded object from the PLU to the first object handler after all the embedded object has been sent from the SLU to the PLU.

56. A computer program product according to claim 55 further comprising:

computer-readable program code means for sending a reply object from the first object handler to the PLU if a synchronous reply to the embedded object is expected;

computer-readable program code means for sending an End Brackets chain from the PLU to the SLU;

computer-readable program code means for sending at least one chain from the PLU to the SLU, the at least one chain containing a 3270 datastream structured field with the reply object embedded therein; and computer-readable program code means for sending the embedded reply object from the SLU to the corresponding second JVM.

* * * * *